3,061,644
PROCESS FOR PRODUCING ETHYLENEDIAMINE OR DERIVATIVES THEREOF
William L. Fierce, Crystal Lake, and Walter J. Sandner, Carpentersville, Ill., assignors to The Pure Oil Company, Chicago, Ill., a corporation of Ohio
No Drawing. Filed Apr. 28, 1958, Ser. No. 731,100
13 Claims. (Cl. 260—583)

This invention relates to catalytic processes and more particularly to a process for the liquid-phase catalytic hydrogenation of cyanogen to produce ethylenediamine or a derivative thereof. More particularly, this invention is concerned with the hydrogenation of the cyanogen in an acidic liquid using a Group VIII noble metal-containing catalyst.

There are numerous references in the literature and in prior patents to processes for preparation of various diamines by high pressure catalytic hydrogenation of dinitriles. These processes, however, have been inapplicable to the hydrogenation of cyanogen to produce ethylenediamine. Prior investigators have found (see "The Kinetics of the Thermal Reaction Between Hydrogen and Cyanogen," by Robertson and Pease, J.A.C.S., 64, 1880 (1942)) that the reaction of hydrogen and cyanogen at elevated temperatures produces hydrogen cyanide. Other investigators, viz., Lind et al., in J.A.C.S. 48, 1556 (1956), have found that hydrogen and cyanogen react at 25° C. when activated with alpha-particles to produce polymers of unknown composition, having the empirical formula $C_6N_6H_4$. Similarly, we have found in previous investigations that attempts to hydrogenate cyanogen using nickel-on-kieselguhr as the catalyst resulted in the complete consumption of the cyanogen without production of any ethylenediamine.

It is therefore one object of this invention to provide a new and improved process for the preparation of ethylenediamine or derivatives thereof.

Another object of this invention is to provide a process for preparation of ethylenediamine from cyanogen.

A feature of this invention is the provision of an improved process for preparation of ethylenediamine by high pressure hydrogenation of cyanogen in an acidic medium using a Group VIII noble metal-containing catalyst.

Another feature of this invention is the provision of an improved process for preparation of ethylenediamine by hydrogenation of cyanogen in solution in acetic acid at a pressure in excess of 50 p.s.i.g., and in the presence of a Group VIII noble-metal catalyst supported on a refractory support, such as activated alumina or silica-alumina, followed by hydrolysis of the intermediate reaction product.

Other objects and features of this invention will become apparent from time to time throughout the specification and claims as hereinafter related.

This invention is based upon the discovery that cyanogen can be hydrogenated at pressures in excess of about 50 p.s.i.g., and temperatures of 0–300° C., in an acidic medium, in the presence of a Group VIII noble metal-containing catalyst to produce an acid derivative of ethylenediamine. This acid derivative can then be hydrolyzed and the ethylenediamine recovered by distillation, extraction, or other conventional procedures. The pressure at which the reaction takes place is not critical except that it should be in excess of about 50 p.s.i.g., and preferably in the range of 1500–3000 p.s.i.g. Temperatures in the range of 0°–300° C. may be used, although in most cases the reaction proceeds satisfactorily at room temperature. The preferred catalyst for the reaction is rhodium or platinum on alumina or silica-alumina, although other Group VIII noble metals can be used on any refractory high-surface-area support. The reaction requires an acidic medium to produce ethylenediamine as the product. In either a neutral or basic environment, ethylenediamine is not obtained as a product, although the cyanogen is consumed.

Prior patents, such as Howk, 2,166,150 and 2,166,151, Signaigo, 2,166,183, and Schmidt, 2,165,515, teach that aliphatic dinitriles may be hydrogenated, using nickel or cobalt catalysts, to produce the corresponding diamines. In earlier unsuccessful experiments, we attempted to hydrogenate cyanogen at temperatures in the range from room temperature to 115° C. using a catalyst consisting of nickel supported on kieselguhr. In these experiments the cyanogen was completely consumed but no ethylenediamine was formed. Several experiments were carried out using different temperatures in the range from about room temperature to 115° C. and using a hydrogen-cyanogen mol ratio in the range of 5.0 to 7. In each case the cyanogen was completely consumed but no ethylenediamine was formed. The reaction products were analyzed only for ethylenediamine so the products of reaction are not known, although it is supposed that there was probably some formation of hydrogen cyanide, methylamine, and paracyanogen. It was only when we changed to the catalyst and reaction conditions of the present invention that we found it possible to hydrogenate cyanogen to produce ethylenediamine. The following examples are illustrative of our process.

*Example I*

A stainless steel reaction bomb having a capacity slightly more than 100 cc., was equipped for recording of temperature and pressure against time. Each run in the bomb was made batch-wise and lasted about two days. During each run the bomb was rocked and temperature and pressure were recorded. The bomb was charged with 25 cc. of glacial acetic acid, 3.05 g. of cyanogen, and 2.5 g. of a catalyst consisting of 0.5 wt. percent rhodium on alumina. The bomb was then pressurized with hydrogen. The maximum temperature reached during the reaction was 196° C., and the maximum pressure attained was 2100 p.s.i.g. In the course of the reaction the pressure dropped by 780 p.s.i.g. as a result of consumption of hydrogen and decomposition of cyanogen. The products of the bomb were then analyzed. It was found that the cyanogen charged had been completely consumed in the reaction. Analysis using paper chromatography established that mono- and diacetyl ethylenediamine were formed in the reaction. When the reaction products were subjected to hydrolysis, ethylenediamine was formed as the product.

*Example II*

The apparatus used in Example I was charged with 2.5 g. of the same catalyst, 4.17 g. of cyanogen, and 25 cc. of alcohol, and pressurized with hydrogen. During the two days' duration of the run, the maximum pressure reached in the reactor was 1830 p.s.i.g., and the maximum temperature was 98° C. The pressure in the reactor fell 670 p.s.i. during the reaction. When the bomb was opened and the contents were analyzed, it was found that all of the cyanogen had been consumed. However, analysis of the products showed that no ethylenediamine was formed, nor was any derivative of ethylene diamine present. It would appear that the reaction products probably included methylamine, hydrogen cyanide, and paracyanogen, although analysis was not made for these materials.

*Example III*

In another run the apparatus used in the preceding examples was charged with 20 cc. methanol, 14.7 cc.

anhydrous ammonia, 2.5 g. of the catalyst used in the preceding runs, and 2.25 g. of cyanogen. The bomb was then pressurized with hydrogen and the reaction allowed to proceed as in the preceding runs. During the two days' duration of this run, the maximum pressure reached was 2590 p.s.i.g., and the maximum temperature in the reactor 93° C. The pressure dropped 50 p.s.i. during the run. When the bomb was opened, the contents were analyzed for cyanogen and for ethylenediamine. It was found that all of the cyanogen had been consumed in the reaction, but no ethylenediamine was formed nor was any derivative of ethylenediamine formed.

*Example IV*

In still another experiment the apparatus used in the preceding runs was charged with 2.5 g. of the same catalyst used in the other runs, 3.10 g. of cyanogen, and 25 cc. glacial acetic acid. The bomb was then pressured with hydrogen and allowed to react for two days. During the run the pressure dropped by 990 p.s.i. When the bomb was opened and the content analyzed, it was found that all of the cyanogen had been consumed. The mixture of reaction products was analyzed by paper chromatography for the presence of ethylenediamine or derivatives thereof. A substantial amount of mono- and diacetyl ethylenediamine was found in the mixture of reaction products. When the reaction products were hydrolyzed, ethylenediamine was formed.

*Example V*

A 100 cc. stainless steel reaction bomb is charged with 25 cc. of 10% aqueous hydrochloric acid and 2.5 g. of a rhodium on silica-alumina (75% silica) catalyst and 3.5 g. of cyanogen. The bomb is pressurized with hydrogen and allowed to react over a period of two days. During the run the maximum pressure reached is about 1900 p.s.i.g. The pressure drop during the run is about 900 p.s.i. When the bomb is opened and the content analyzed, the cyanogen is found to have been totally consumed. The mixture of reaction products is analyzed by paper chromatography and found to contain ethylenediamine dihydrochloride.

*Example VI*

In another run a 100 cc. stainless steel reaction bomb is charged with 25 cc. glacial acetic acid and 3.5 g. of cyanogen and 2.5 g. of catalyst. In this run the catalyst used consists of 1.0 wt. percent platinum on activated alumina. The bomb is pressurized with hydrogen and allowed to react for a period of about two days. During the run the maximum pressure attained is about 2000 p.s.i.g., and the pressure drop during the reaction is about 950 p.s.i.g. When the bomb is opened and the content analyzed, it is found that the cyanogen has been totally consumed. Analysis of the reaction product by paper chromatography reveals the presence of a mixture of mono- and diacetyl ethylenediamine in the reaction product. These derivatives may be converted to ethylenediamine by hydrolysis and separated from the reaction mixture by distillation, extraction, or other conventional separatory techniques.

*Example VII*

In still another run a stainless steel reaction bomb of 130 cc. volume was charged with 20.8 g. cyanogen, 60 cc. glacial acetic acid, and 10 g. of catalyst consisting of 0.5% rhodium on alumina. The reactor was charged with hydrogen to a pressure of 2250 p.s.i.g. at room temperature. The reactor was then heated to 250° F. with shaking for about 8 hours. When the reactor was cooled to room temperature the pressure was 2000 p.s.i.g. The product was analyzed by reaction with aqueous base and distillation of the liberated ethylenediamine. The distillate was titrated to determine the amount of volatile base formed. Analysis by paper chromatography showed that ethylenediamine was the only base present in the distillate. In this run the selectivity for ethylenediamine was 22.1% based on hydrogen consumed in the reaction.

*Example VIII*

Another series of runs was carried out in which the catalytic hydrogenation of cyanogen to ethylenediamine was attempted at atmospheric pressure. Cyanogen and excess hydrogen were passed through a reactor in a flow system at atmospheric pressure at a gaseous hourly space velocity in the range of 500 to 650. Four different catalysts were evaluated, viz., copper chromite, 0.5% rhodium on alumina, 0.6% platinum on alumina, and a commercial hydrogenation catalyst manufactured by Universal Oil Products Co. Reaction temperatures were varied from room temperature to 300° C. Some reaction took place and conversions increased with temperature. The major product was hydrogen cyanide. No ethylenediamine was formed. It therefore appears that the use of elevated pressures is essential if ethylenediamine is to be obtained.

While this invention has been described using acetic or hydrochloric acid as the reaction medium, it is to be noted that any organic acid or mineral acid may be used which is not destructively reactive with cyanogen or with the catalyst or its support. Also, while the catalyst described in the specific examples were rhodium or platinum on alumina or silica-alumina, it is to be understood that any Group VIII noble metal may be used on any inert, refractory, high-surface-area support. The concentration of metal catalyst on the support is dependent somewhat on the quantity of catalyst used. Thus, when larger quantities of catalyst are used, smaller concentrations of the noble metal may be used. Catalysts which are effective for hydrogenation of cyanogen include any Group VIII noble metal in a concentration of 0.01–10.0%, preferably 0.1–0.5%, on a refractory high-surface-area support, such as alumina, silica-alumina, etc. The exact pressures required for the process vary somewhat with the type of catalyst used and the duration of the reaction. Thus, at lower pressures the hydrogenation will take place but requires a longer period of time. Any pressure in excess of about 50 p.s.i.g. is generally satisfactory provided that the mol ratio of hydrogen to cyanogen is not less than about 4. Since the reaction is generally a liquid-phase reaction and the temperature of the reaction is considerably in excess of the critical temperature of hydrogen, there is no upper limit of pressure for this process. As has been previously pointed out, the temperature range is not critical within the range of 0–300° C. At temperatures substantially above 300° C., e.g., 500–600° C., the process is completely inoperative to produce ethylenediamine, since at these temperatures hydrogen reacts with cyanogen to produce hydrogen cyanide.

What is claimed is:

1. The method which comprises reacting cyanogen with hydrogen, at a temperature of 0°–300° C., a pressure in excess of about 50 p.s.i.g., in a liquid acidic medium selected from the group consisting of liquid organic acids and mineral acids, which liquid acidic medium is not destructively reactive with cyanogen or the catalyst, and in the presence of a catalyst consisting essentially of a Group VIII noble metal on a refractory support, to produce an acid derivative of ethylenediamine.

2. A method in accordance with claim 1 in which the reaction is carried out using a hydrogen-cyanogen mol ratio of not less than about 4.

3. A method in accordance with claim 1 in which the noble metal-containing catalyst used is a high-surface-area refractory support having a Group VIII noble metal deposited thereon.

4. A method of preparing ethylenediamine which comprises hydrogenating cyanogen in acidic liquid selected from the group consisting of liquid organic acids and mineral acids, which acidic liquid is not destructively reactive with cyanogen or the catalyst, at a temperature of 0°–

300° C., and a pressure in excess of about 50 p.s.i.g., in the presence of a catalyst consisting essentially of a Group VIII noble metal on a refractory support, and hydrolyzing the resulting product to obtain ethylenediamine.

5. A method in accordance with claim 4 in which the reaction is carried out using a hydrogen-cyanogen mol ratio of not less than about 4.

6. A method in accordance with claim 4 in which the noble metal-containing catalyst used is a high-surface-area refractory support having a Group VIII noble metal deposited thereon.

7. A method of preparing ethylenediamine which comprises hydrogenating cyanogen at a hydrogen pressure of 1500–3000 p.s.i.g., in glacial acetic acid, at a temperature of 0°–300° C., in the presence of a catalyst consisting of a high-surface-area refractory support having a Group VIII noble metal deposited thereon, and hydrolyzing the resulting product to obtain ethylenediamine.

8. A method in accordance with claim 7 in which the catalyst used is rhodium supported on alumina.

9. A method in accordance with claim 7 in which the catalyst used is platinum supported on silica-alumina.

10. The method which comprises reacting cyanogen with hydrogen, at a temperature of 0°–300° C., a pressure in excess of about 50 p.s.i.g., in acetic acid, and in the presence of a catalyst consisting of a Group VIII noble metal on a refractory support, to produce an acid derivative of ethylenediamine.

11. The method which comprises reacting cyanogen with hydrogen, at a temperature of 0°–300° C., a pressure in excess of about 50 p.s.i.g., in hydrochloric acid, and in the presence of a catalyst consisting of a Group VIII noble metal on a refractory support, to produce an acid derivative of ethylenediamine.

12. The method of preparing ethylenediamine which comprises hydrogenating cyanogen in acetic acid, at a temperature of 0°–300° C., and a pressure in excess of about 50 p.s.i.g., in the presence of a catalyst consisting essentially of a Group VIII noble metal on a refractory support, and hydrolyzing the resulting product to obtain ethylenediamine.

13. The method of preparing ethylenediamine which comprises hydrogenating cyanogen in hydrochloric acid at a temperature of 0°–300° C., and a pressure in excess of about 50 p.s.i.g., in the presence of a catalyst consisting essentially of a Group VIII noble metal on a refractory support, and hydrolyzing the resulting product to obtain ethylenediamine.

References Cited in the file of this patent

UNITED STATES PATENTS 2,166,971     Schmidt et al. _____ July 25, 1939